(12) United States Patent
Ohmori et al.

(10) Patent No.: US 11,644,632 B2
(45) Date of Patent: May 9, 2023

(54) METHOD FOR MANUFACTURING OPTICAL DEVICE

(71) Applicant: Fujikura Ltd., Tokyo (JP)

(72) Inventors: Kenichi Ohmori, Sakura (JP); Norihiro Ishikura, Sakura (JP); Hitoshi Uemura, Sakura (JP)

(73) Assignee: Fujikura Ltd., Tokyo (JP)

( * ) Notice: Subject to any disclaimer, the term of this patent is extended or adjusted under 35 U.S.C. 154(b) by 452 days.

(21) Appl. No.: 16/627,047

(22) PCT Filed: Oct. 23, 2017

(86) PCT No.: PCT/JP2017/038171
§ 371 (c)(1),
(2) Date: Dec. 27, 2019

(87) PCT Pub. No.: WO2019/003466
PCT Pub. Date: Jan. 3, 2019

(65) Prior Publication Data
US 2020/0124817 A1    Apr. 23, 2020

(30) Foreign Application Priority Data

Jun. 29, 2017 (JP) .............................. JP2017-126964

(51) Int. Cl.
*G02B 6/44* (2006.01)
*G01M 11/00* (2006.01)
*G02B 6/255* (2006.01)

(52) U.S. Cl.
CPC ........... *G02B 6/4471* (2013.01); *G01M 11/30* (2013.01); *G02B 6/255* (2013.01)

(58) Field of Classification Search
CPC ....... G02B 6/4471; G02B 6/255; G01M 11/30
See application file for complete search history.

(56) References Cited

U.S. PATENT DOCUMENTS

| 4,288,107 A * | 9/1981 | Schwartze | .............. F16L 39/00 |
| | | | 285/381.4 |
| 4,510,435 A * | 4/1985 | Tanno | ..................... G01R 31/58 |
| | | | 324/540 |
| 7,781,724 B2 | 8/2010 | Childers et al. | |

(Continued)

FOREIGN PATENT DOCUMENTS

| CN | 103443679 A | 12/2013 | |
| EP | 3916446 A1 * | 12/2021 | ........... G02B 6/3636 |

(Continued)

OTHER PUBLICATIONS

International Search Report issued in corresponding International Application No. PCT/JP2017/038171 dated Jan. 16, 2018 (2 pages).

*Primary Examiner* — Jeffrey T Carley
(74) *Attorney, Agent, or Firm* — Osha Bergman Watanabe & Burton LLP (57) ABSTRACT

Provided is a method of manufacturing an optical device that includes a multicore fiber including a plurality of cores and a fan-in/fan-out device including single-core fibers that are respectively connected to the cores based on a plurality of connection combinations when the multicore fiber is rotated. The method includes: a first step of determining an optical loss for each of the cores while changing the connection combinations between the single-core fibers and the cores; and a second step of selecting one of the connection combinations according to a result of the first step and connecting an end portion of the multicore fiber and an end portion of the fan-in/fan-out device to connect the single-core fibers with the cores based on the one of the connection combinations.

7 Claims, 9 Drawing Sheets

(56) References Cited

U.S. PATENT DOCUMENTS

| | | | | |
|---|---|---|---|---|
| 8,270,784 B2* | 9/2012 | Thomson | ............... | G02B 6/125 385/31 |
| 2004/0197066 A1* | 10/2004 | Daoud | ................ | G02B 6/4471 385/136 |
| 2011/0249940 A1* | 10/2011 | Sasaoka | ............... | G02B 6/2821 385/39 |
| 2011/0280517 A1* | 11/2011 | Fini | ........................ | G02B 6/262 29/428 |
| 2014/0010501 A1* | 1/2014 | Saito | .................... | G02B 6/2551 156/182 |
| 2014/0010508 A1* | 1/2014 | Matsuo | .............. | G02B 6/02042 385/127 |
| 2014/0178018 A1* | 6/2014 | Matsuo | .................. | G02B 6/255 385/98 |
| 2014/0294350 A1* | 10/2014 | Bradley | ............. | G02B 6/02042 385/78 |
| 2014/0369659 A1* | 12/2014 | Uemura | ............. | G02B 6/02042 385/126 |
| 2016/0025935 A1* | 1/2016 | Ide | ......................... | G02B 6/421 385/24 |
| 2016/0097903 A1 | 4/2016 | Li et al. | | |
| 2016/0161673 A1* | 6/2016 | Hamaguchi | .......... | G02B 6/2553 65/378 |

FOREIGN PATENT DOCUMENTS

| | | |
|---|---|---|
| JP | 2013-054116 A | 3/2013 |
| JP | 2014-126575 A | 7/2014 |
| JP | 2015-001673 A | 1/2015 |
| JP | 2015-041078 A | 3/2015 |
| JP | 2015-152774 A | 8/2015 |
| JP | 5782104 B2 | 9/2015 |
| WO | 2012/121320 A1 | 9/2012 |

* cited by examiner

METHOD FOR MANUFACTURING OPTICAL DEVICE

CROSS-REFERENCE TO RELATED APPLICATIONS

This application claims benefit of priority from Japanese Patent Application No. 2017-126964 filed on Jun. 29, 2017, the contents of which are incorporated herein by reference in its entirety.

TECHNICAL FIELD

The present invention relates to a method for manufacturing an optical device

BACKGROUND ART

In recent years, research and development of a multicore fiber (MCF), which is an optical fiber having a structure including a plurality of cores and a common cladding covering the periphery of the plurality of cores, has been actively conducted. Multicore fibers are attracting attention as transmission media capable of increasing the transmission capacity of an optical communication system because they can transmit individual information to each core.

In addition, a multicore fiber may be used as an optical fiber sensor (for example, an optical fiber sensor of an FBG type). An optical fiber sensor measures various physical quantities (for example, stress, strain, temperature, and the like) using an optical fiber (including a multicore fiber) as a sensor. In the above-mentioned FBG-type optical fiber sensor, a Fiber Bragg Grating (FBG) is formed in the core of an optical fiber (including a multicore fiber). By using the reflection characteristics that the FBG changes according to the surrounding environment, distributions of various physical quantities in the length direction of the optical fiber are measured.

A fan-in/fan-out device is connected to such a multicore fiber as an input/output device for connecting each core and an external optical fiber. The fan-in/fan-out device is manufactured such that a plurality of holes are formed in a glass preform (capillary) where a single mode fiber is inserted into a hole, a single mode fiber is inserted in each of the plurality of holes formed in the glass preform, and an elongated portion (portion elongated while the diameter is reduced) is formed by fusing and elongating a portion of the glass preform in which the single mode fiber is inserted while heating. Each of the above-described single mode fiber is an optical fiber, a plurality of which is provided in the fan-in/fan-out device, and an external optical fiber is connected to one end of the single mode fiber and one core of a multicore fiber is connected to the other end of the same.

Patent Document 1 described below discloses a shape sensing technique for measuring a shape of the optical fiber sensor (a shape of an object where the optical fiber sensor is attached) by an Optical Frequency Domain Reflectometry (OFDR) method using an FBG type optical fiber sensor using a multicore fiber. In addition, Patent Documents 2 to 4 described below disclose examples of fan-in/fan-out devices that connect each core of a multicore fiber to an external optical fiber.

PATENT DOCUMENTS

[Patent Document 1] U.S. Pat. No. 7,781,724
[Patent Document 2] Japanese Patent No. 5782104
[Patent Document 3] Japanese Unexamined Patent Application, First Publication No. 2015-1673
[Patent Document 4] Japanese Unexamined Patent Application, First Publication No. 2015-152774

An optical device in which a fan-in/fan-out device is connected (fused) to a multicore fiber may have a small light loss. However, in such an optical device, the occurrence of light loss is inevitable due to the following causes.
(1) Manufacturing Error of Fan-In/Fan-Out Device
For example, the positional deviation of the hole formed in the glass preform, variation in inter-core distance in an elongating portion (due to the positional deviation in the hole of single-core fiber generated at the time of melting and elongating), and misalignment of the core in the elongated portion (caused by variation in a diameter reduction ratio)
(2) Coupling Loss Between Multicore Fiber and Fan-In/Fan-Out Device
For example, there is a loss due to a mismatch between the core diameter of the elongated portion and the core diameter of the multicore fiber fused to the elongated portion. Such a mismatch essentially occurs in the manufacture of a fan-in/fan-out device having an elongated portion, and occurs due to the variation of the diameter reduction ratio of the elongated portion when melting and elongating a glass preform in which a single-core fiber is inserted.

SUMMARY

One or more embodiments of the present invention provide a method for manufacturing an optical device capable of manufacturing an optical device having a small optical loss due to a manufacturing error.

One or more embodiments of the present invention provide a method for manufacturing an optical device including, a multicore fiber comprising a plurality of cores, and a fan-in/fan-out device including a plurality of single-core fibers arranged so as to be connectable to the cores respectively based on a plurality of combinations when the multicore fiber is rotated, the method comprising: a first step of determining an optical loss for each core while changing a combination of the single-core fibers of the fan-in/fan-out device to be connected to the cores of the multicore fiber (i.e., a connection combination); and a second step of selecting one combination of the single-core fibers of the fan-in/fan-out device to be connected to the cores of the multicore fiber according to the result of the first step, and connecting an end portion of the multicore fiber and an end portion of the fan-in/fan-out device so that the single-core fibers and the core of the multicore fibers of the selected combination are connected.

According to one or more embodiments of the present invention, in the first step, the optical loss is determined by measuring an intensity of an optical signal for each core input from either one of the multicore fiber or the fan-in/fan-out device and output from another one of the multicore fiber or the fan-in/fan-out device in a state where the end portion of the multicore fiber and the end portion of the fan-in/fan-out device are in proximity.

According to one or more embodiments of the present invention, in the first step, the optical loss is determined by determining a difference between a distance of the cores of the multicore fiber and a distance of the single core fibers of the fan-in/fan-out device from respective images obtained by capturing the end portion of the multicore fiber and the end portion of the fan-in/fan-out device.

According to one or more embodiments of the present invention, in the first step, the optical loss is determined by determining a difference between a core diameter of the multicore fiber and a core diameter of the single-core fibers of the fan-in/fan-out device from respective images obtained by capturing the end portion of the multicore fiber and the end portion of the fan-in/fan-out device.

According to one or more embodiments of the present invention, in the second step, the optical loss is determined by determining a difference between a mode field diameter of the multicore fiber and a mode field diameter of the single-core fibers of the fan-in/fan-out device obtained by a method of measuring optical characteristics at the end portion of the multicore fiber and the end portion of the fan-in/fan-out device.

According to one or more embodiments of the present invention, a distance between the single core fibers of the fan-in/fan-out device is different for each combination of the single-core fibers of the fan-in/fan-out device that are connected to the core of the multicore fiber.

According to one or more embodiments of the present invention, a core diameter of the single core fiber of the fan-in/fan-out device is different for each combination of the single-core fibers of the fan-in/fan-out device that are connected to the core of the multicore fiber.

According to one or more embodiments of the present invention, it is possible to manufacture an optical device having a small light loss due to a manufacturing error.

DETAILED DESCRIPTION

Hereinafter, a method for manufacturing an optical device according to one or more embodiments of the present invention will be described in detail with reference to the drawings. In the drawings referred to in the following, in order to facilitate understanding, the scale of dimensions of each member is appropriately changed and illustrated as necessary.

(Configuration of Optical Device)

Figure 1:
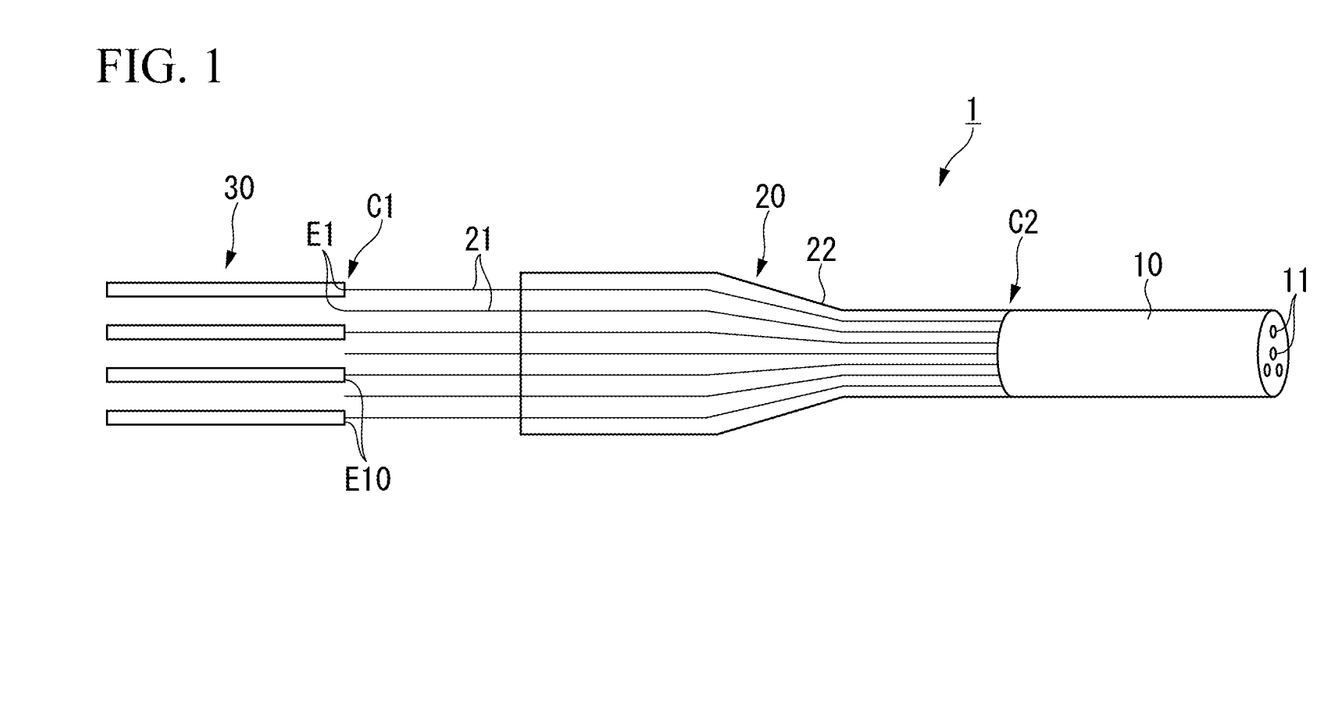
FIG. 1 is a schematic view showing an optical device according to one or more embodiments of the present invention.

FIG. 1 is a schematic view showing an optical device according to one or more embodiments of the present invention. As shown in FIG. 1, the optical device 1 according to one or more embodiments includes a multicore fiber 10, a fan-in/fan-out device 20, and a plurality of signal transmission fibers 30. Such an optical device 1 makes an optical signal propagated through the signal transmission fiber 30 enter the multicore fiber 10 via the fan-in/fan-out device 20 or makes an optical signal propagated through the multicore fiber 10 enter the signal transmission fiber 30 through the fan-in/fan-out device 20. The optical device 1 shown in FIG. 1 is applicable to an optical fiber sensor using, for example, a multicore fiber 10 as a sensor.

Figure 2:
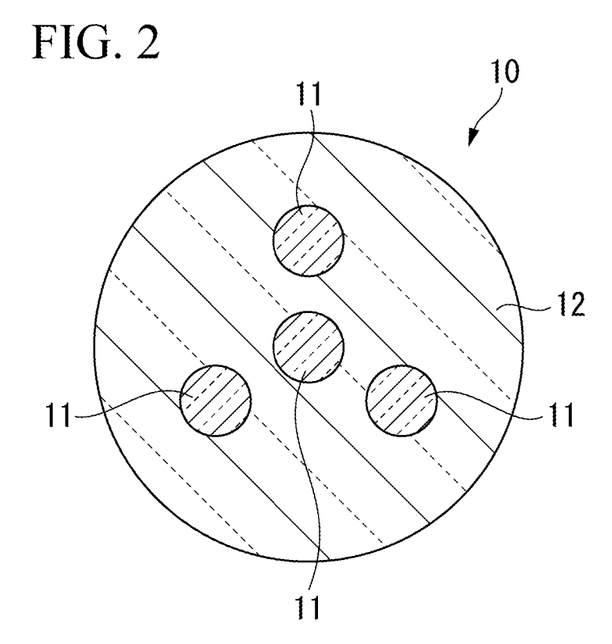
FIG. 2 is a cross-sectional view showing one example of a multicore fiber according to one or more embodiments of the present invention.

FIG. 2 is a cross-sectional view showing one example of the multicore fiber according to one or more embodiments of the present invention. As shown in FIG. 2, the multicore fiber 10 has a plurality of cores 11 and a common cladding 12 covering the periphery of the cores 11. The multicore fiber 10 illustrated in FIG. 2 includes a total of four cores 11 where one core 11 is disposed at the center of the multicore fiber 10 and three cores 11 are disposed concentrically around the center core 11. Such a multicore fiber 10 can propagate individual optical signals to the respective cores 11.

Figure 3:
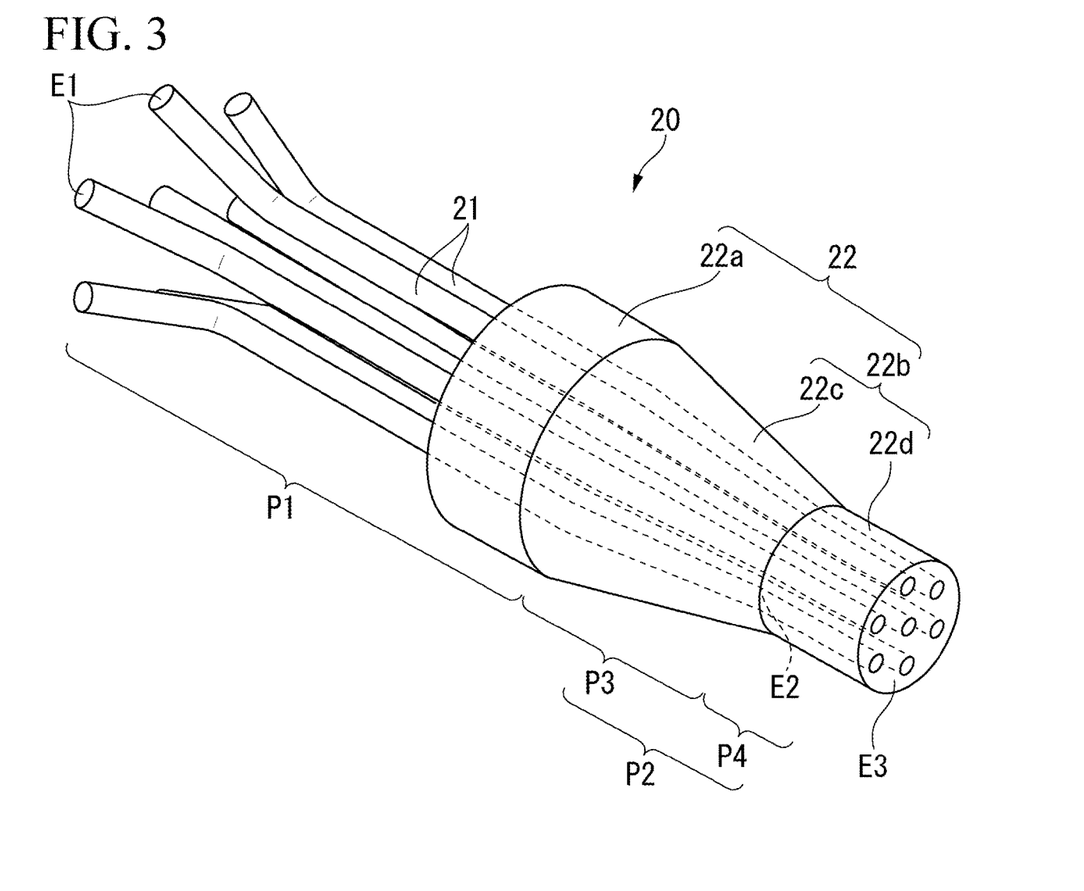
FIG. 3 is a perspective view showing a fan-in/fan-out device according to one or more embodiments of the present invention.

FIG. 3 is a perspective view showing a fan-in/fan-out device according to one or more embodiments of the present invention. As shown in FIGS. 1 and 3, the fan-in/fan-out device 20 includes a plurality of single-core fibers 21 and a capillary 22, and relay-connects the multicore fiber 10 and a plurality of signal transmission fibers 30. That is, the fan-in/fan-out device 20 causes optical signals propagated through the plurality of signal transmission fibers 30 to be incident on the plurality of cores 11 of the multicore fiber 10 and causes optical signals propagated through the plurality of cores 11 of the multicore fiber 10 to be incident on the plurality of signal transmission fibers 30, respectively.

Figure 4:
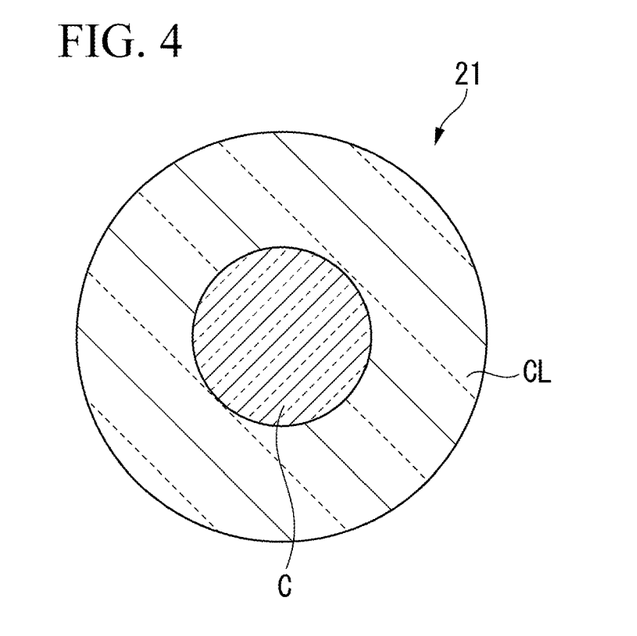
FIG. 4 is a cross-sectional view showing one example of a single-core fiber according to one or more embodiments of the present invention.

FIG. 4 is a cross-sectional view showing an example of a single-core fiber according to one or more embodiments of the present invention. As shown in FIG. 4, the single-core fiber 21 includes a core C and a cladding CL covering the periphery of the core C. The cladding CL has a lower refractive index than the core C. The number of the single-core fibers 21 is greater than the number of cores 11 of the multicore fibers 10, and can be connected to the cores 11 based on a plurality of combinations when the multicore fibers 10 are rotated. With such an arrangement, it is possible to realize an optical device 1 with a small optical loss due to a manufacturing error.

Figure 5:
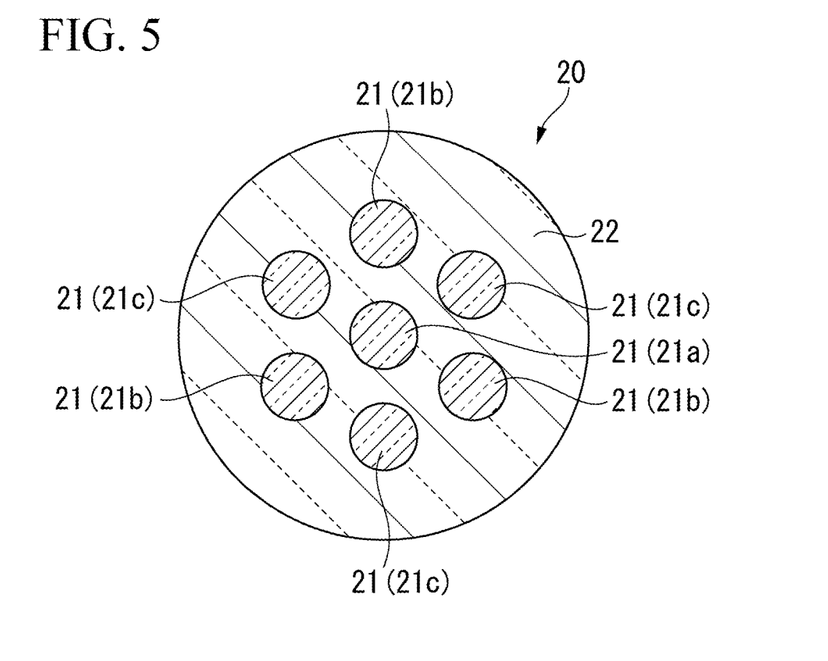
FIG. 5 is a cross-sectional view showing one example of an arrangement of a single-core fiber according to one or more embodiments of the present invention.

FIG. 5 is a cross-sectional view showing an example of the arrangement of single-core fibers according to one or more embodiments of the present invention. In the fan-in/fan-out device 20 illustrated in FIG. 5, one single-core fiber 21 (21a) is disposed at the center of the fan-in/fan-out device 20, and six single-core fibers 21 (21b, 21c) are arranged concentrically around the single-core fiber 21a. In the example shown in FIG. 5, the single-core fibers 21b and the single-core fibers 21c are alternately arranged along the circumferential direction.

In the example shown in FIG. 5, when the multicore fiber 10 is rotated, combinations capable of being connected to the plurality of cores 11 are i) a combination of a single-core fiber 21a and three single-core fibers 21b, and ii) a combination of a single-core fiber 21a and three single-core fibers 21c. In the combination i), the splice is possible when, for example, the core 11 of the multicore fiber 10 is in a state shown in FIG. 2, and in the combination ii), the splice is possible when, for example, the core 11 of the multicore fiber 10 is rotated by 180° from a state shown in FIG. 2. The combination i) and the combination ii) can be referred to as rotationally symmetric (or substantially rotationally symmetric in consideration of manufacturing errors and the like).

In addition, it is also possible to arrange the single-core fibers 21 so that connection with the core 11 becomes possible in a plurality of combinations when the multicore fiber 10 is moved in parallel in the radial direction. However, in the case of such an arrangement, the multicore fiber 10 and the fan-in/fan-out device 20 may be connected in a state of being eccentric in the radial direction (state of axial deviation), and the mechanical strength may be reduced. On the other hand, according to one or more embodiments, the multicore fiber 10 and the fan-in/fan-out device 20 are connected without causing the above-mentioned axial deviation by arranging in rotational symmetry (or substantially rotational symmetry) and the mechanical strength can be increased. For this reason, the arrangement of the single-core fibers 21 may be a rotationally symmetrical (or substantially rotationally symmetrical) arrangement.

As shown in FIGS. 1 and 3, the single-core fiber 21 has a large diameter portion P1 which is one end side portion, and an elongated portion P2 which is the other end side portion extending in the length direction from the large diameter portion P1. The large diameter portion P1 is a portion which is not extended, and an outer diameter thereof is constant in the length direction. Among the single-core fibers 21, the end portion E1 of the large diameter portion P1 of the single-core fiber 21 to be connected to the core 11 of the multicore fiber 10 is connected to the end portion E10 of the signal transmission fiber 30 at the connection portion C1. The large diameter portion P1 may be fusion-spliced to the signal transmission fiber 30. In the example shown in FIG. 1, the end portion E1 of the large diameter portion P1 of each of the four single-core fibers 21 is respectively connected to the end portions E10 of each of the four signal transmission fibers 30.

The end portion E1 of the large diameter portion P1 of the remaining single-core fibers 21 (the single-core fibers 21 which are not connected to the cores 11 of the multicore fiber 10) is not connected to the end portions E10 of the signal transmission fiber 30. Such a large diameter portion P1 which is not connected to the end portion E10 of the signal transmission fiber 30 may be cut so as to shorten its length (or not to extend from the capillary 22) as necessary.

The elongated portion P2 includes a diameter-reduced portion P3 extending from the large diameter portion P1 while reducing the diameter in the length direction, and a small diameter portion P4 extending from the diameter-reduced portion P3. At the diameter-reduced portion P3, the core diameter of the single-core fiber 21 gradually decreases along the extending direction. The ratio (minimum outer diameter/maximum outer diameter) of the minimum outer diameter to the maximum outer diameter of the single-core fiber 21 at the diameter-reduced portion P3 may fall into a range of, for example, 1/1.5 to 1/2.5. The maximum outer diameter of the diameter-reduced portion P3 may be the same as the outer diameter of the large diameter portion P1.

The small diameter portion P4 is a portion of a constant diameter which is formed to extend in the same direction from the end portion E2 in the extension direction of the diameter-reduced portion P3. The end portion E3 in the extension direction of the small diameter portion P4 is connected to the core 11 (see FIG. 2) of the multicore fiber 10 at the connection point C2. The small diameter portion P4 may be fusion-spliced to the multicore fiber 10. According to one or more embodiments, four single-core fibers 21 in the small diameter portion P4 of the seven single-core fibers 21 are connected to the cores 11 of the multicore fiber 10, respectively. The outer diameter of the small diameter portion P4 may be the same as the minimum outer diameter of the diameter-reduced portion P3 and may be the same as the outer diameter of the multicore fiber 10.

The single-core fiber 21 of the fan-in/fan-out device according to one or more embodiments includes a structure including a large diameter portion P1 and an elongated portion P2, and the elongated portion P2 includes a diameter-reduced portion P3 and a small diameter portion P4. However, the structure can be, one or both of the large diameter portion P1 and the small diameter portion P4 may be omitted. When there is no small diameter portion P4 the elongated portion P2 is formed of only the diameter-reduced portion P3.

As shown in FIG. 3, the capillary 22 holds a plurality of single-core fibers 21 in a substantially bundled state, and is formed of glass or the like. The capillary 22 is provided in a portion of or all of the single-core fiber 21 in the length direction. The capillary 22 includes a base 22a and an extension portion 22b extending from the base 22a. The extension portion 22b includes a tapered portion 22c extending from the base portion 22a while reducing the diameter in the length direction, and a tip portion 22d extending from the tapered portion 22c. The base 22a can be formed on a portion of the large diameter portion P1 of the single-core fiber 21. The tapered portion 22c and the tip portion 22d are formed at positions corresponding to the diameter-reduced portion P3 and the diameter-reduced portion P4 of the single-core fiber 21, respectively.

The signal transmission fibers 30 are optical fibers respectively connected to the plurality of cores 11 of the multicore fiber 10 via the fan-in/fan-out device 20. The signal transmission fiber 30 transmits an optical signal to be incident on the plurality of cores 11 of the multicore fiber 10 or transmits an optical signal propagated through the plurality of cores 11 of the multicore fiber 10.

(Method for Manufacturing Optical Device)

Figure 6:
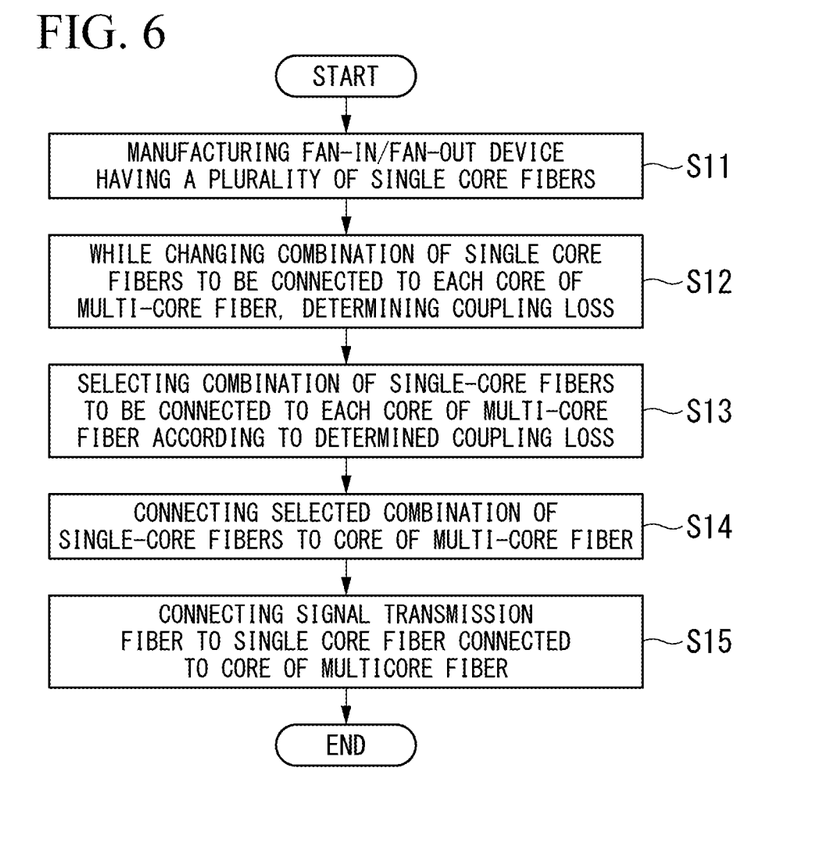
FIG. 6 is a flowchart showing one example of a manufacturing method of the optical device according to one or more embodiments of the present invention.

FIG. 6 is a flowchart showing an example of a method for manufacturing an optical device according to one or more embodiments of the present invention. As shown in FIG. 6, when the manufacture of the optical device 1 is started, the process of manufacturing the fan-in/fan-out device 20 having the plurality of single-core fibers 21 described with reference to FIGS. 1 and 3 (Step S11).

In Step S11, the process that the single-core fiber 21 is inserted in each of a plurality of holes of the cylindrical capillary 22 having the plurality of holes in which the single-core fiber 21 is inserted, and the process of melt-drawing the capillary 22 while partially heating the capillary 22 where the plurality of single-core fibers 21 is inserted therein to form the elongated portion P2 (extension portion 22b) are sequentially performed. The holes of the capillary 22 are formed such that the single-core fibers 21 to be inserted are arranged as shown in FIG. 5. Thus, the fan-in/fan-out device 20 shown in FIG. 3 is manufactured.

Next, while changing the combination of the single-core fibers 21 to be connected to each of the plurality of cores 11 of the multicore fiber 10, a step of obtaining the coupling loss for each core 11 is performed (Step S12: first step). In Step S12, first, an end portion of the multicore fiber 10 and an end portion (end portion E3) of the elongated portion P2 of the fan-in/fan-out device 20 are respectively captured, and one combination of single-core fibers 21 to be connected to the plurality of cores 11 of the multicore fiber 10 is set based on the obtained image. For example, a combination of a single-core fiber 21a and three single-core fibers 21b shown in FIG. 5 is set.

When the setting described above is completed, the end portion of the multicore fiber 10 and the end portion (end portion E3) of the extension portion 22b of the fan-in/fan-out device 20 is brought into a state of being in proximity so that the core of the single-core fiber 21 in the set combination faces the core 11 of the multicore fiber 10. Then, when an optical signal is individually incident from the other end portion of the single-core fiber 21 (single-core fiber 21 disposed so that one end portion faces the core 11 of the multicore fiber 10), the light intensity of the light signal emitted from the opposed core 11 is separately measured.

Subsequently, another combination of the single-core fibers 21 to be connected to the plurality of cores 11 of the multicore fiber 10 is set. For example, a combination of a single-core fiber 21a and three single-core fibers 21c shown in FIG. 5 is set. When the setting is completed, for example, the multicore fiber 10, which is brought into a state of being in proximity to the end portion (end portion E3) of the elongated portion P2 of the fan-in/fan-out device 20, is rotated such that the core of the fiber 21 of the set combination faces the core 11 of the multicore fiber 10. Then, when the optical signal is again separately incident from the other end of the single-core fiber 21 (single-core fiber 21 disposed so that one end faces the core 11 of the multicore fiber 10), the light intensity of the optical signal emitted from the facing core 11 is separately measured.

Based on the above, the light intensity emitted from each core 11 of the multicore fiber 10 is measured when the combination of the single-core fiber 21 to be connected to the plurality of cores 11 of the multicore fiber 10 is changed. The measured light intensity reflects the coupling loss between the core 11 of the multicore fiber 10 and the single-core fiber 21. For this reason, the coupling loss for each core 11 is determined when the combination of the single-core fibers 21 to be connected to the plurality of cores 11 of the multicore fiber 10 is changed.

Next, a combination of single-core fibers 21 to be connected to each core 11 of the multicore fiber 10 is selected according to the determined coupling loss (Step S13: second step). For example, the measurement results for each combination of single-core fibers 21 are compared, and a combination of single-core fibers 21 with high intensity of the optical signal emitted from each core 11 and small variation is selected. Here, it is assumed that a combination of the single-core fiber 21a and the three single-core fibers 21b shown in FIG. 5 is selected.

Next, the process of connecting the end portion of the multicore fiber 10 and the end portion (end portion E3) of the elongated portion P2 of the fan-in/fan-out device 20 is performed so that the single-core fiber 21 and the core 11 of the multicore fiber 10 of the selected combination are connected (Step S14: second step). For example, the end portion of the multicore fiber 10 and the end portion (end portion E3) of the elongated portion P2 of the fan-in/fan-out device 20 are fusion-spliced such that the combination of the single-core fiber 21a and the three single-core fibers 21b shown in FIG. 5 and the core 11 of the multicore fiber 10 are connected.

When the process described above is completed, the process is performed such that the end portion E10 of the signal transmission fiber 30 is connected to the end portion E1 of the single-core fiber 21 connected to the core 11 of the multicore fiber 10 (Step S15). The end portion E10 of the signal transmission fiber 30 may be connected to the end portion E1 of all the single-core fibers 21 after the fan-in/fan-out device 20 is manufactured in Step S11. In such a case, Step S15 is omitted.

According to one or more embodiments described above, in Step S12, optical signals are individually incident from the other end of the single-core fiber 21 (the single-core fiber 21 disposed so that one end faces the core 11 of the multicore fiber 10). Occasionally, the light intensity of the light signal emitted from the opposing core 11 is measured individually. However, conversely to this, optical signals may be made incident from a side of the multicore fiber 10, and optical signals emitted from the other end of the single-core fiber 21 may be individually measured.

As described above, according to one or more embodiments, a fan-in/fan-out device 20 is manufactured that has a plurality of single-core fibers 21 arranged so as to enable splicing with the core 11 in a plurality of combinations when the multicore fiber 10 is rotated, and the coupling loss for each core 11 is determined while changing the combination of the single-core fibers 21 to be connected to the core 11 of the multicore fiber 10. Then, according to the result, one combination of the single-core fibers 21 is selected, and the end portion of the multicore fiber 10 and the end portion E3 of the elongated portion P2 of the fan-in/fan-out device 20 is connected so that the single-core fiber 21 and the core 11 of the multicore fiber 10 of the selected combination are connected.

Thus, according to one or more embodiments, among the combinations of the plurality of single-core fibers 21 that can be connected to the core 11 of the multicore fiber 10, the combination of the single-core fibers 21 with small coupling loss is selected to connect to the core 11 of the multicore fiber 10. Therefore, the optical device 1 can be manufactured with a small optical loss due to the manufacturing error.

According to one or more embodiments described above, the example of selecting the combination of the single-core fibers 21 in which the coupling loss decreases is described. However, the combination of the single-core fibers 21 in which the variation of the coupling loss decreases may be selected. By selecting such a combination, variations in intensity among the cores can be reduced and optical signals with uniform intensity can be obtained which is advantageous from the point of view of a Signal to Noise (S/N) ratio.

Figure 7A:
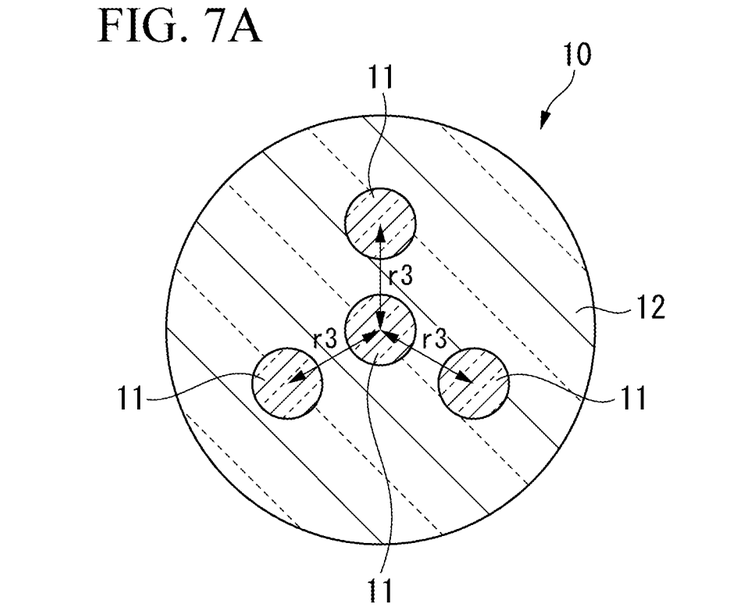
FIG. 7A is a cross-sectional view showing one example of a multicore fiber and a fan-in/fan-out device according to one or more embodiments of the present invention.
Figure 7B:
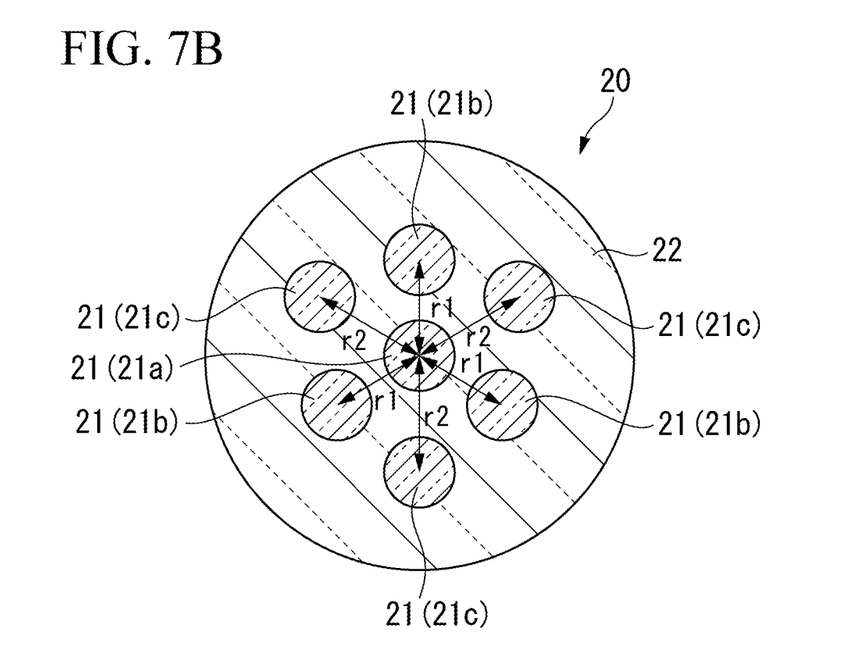
FIG. 7B is a cross-sectional view showing one example of a multicore fiber and a fan-in/fan-out device according to one or more embodiments of the present invention.

FIGS. 7A and 7B are cross-sectional views showing an example of a multicore fiber and a fan-in/fan-out device according to one or more embodiments of the present invention. FIG. 7A is a cross-sectional view of the multicore fiber 10 at the connection point C2, and FIG. 7B is a cross-sectional view of the fan-in/fan-out device 20 at the connection point C2.

The optical device according to one or more embodiments is manufactured basically through the steps shown in the flow chart of FIG. 6 as in the optical device of the above-described embodiments. However, according to one or more embodiments discussed below, the configuration of the fan-in/fan-out device 20 manufactured in Step S11 in FIG. 6 and the method of obtaining the coupling loss in Step S12 in FIG. 6 are different from those according to the above-described embodiments. In particular, in the fan-in/fan-out device 20 manufactured according to one or more embodiments, the distance between the single-core fibers 21 is different for each combination of single-core fibers 21 to be connected to the core 11 of the multicore fiber 10. Furthermore, according to one or more embodiments, without making an optical signal incident on the multicore fiber 10 and the fan-in/fan-out device 20, the coupling loss is estimated from an image obtained by capturing the end portion of the multicore fiber 10 and the fan-in/fan-out device 20.

In the fan-in/fan-out device 20 according to one or more embodiments, the combination that can be connected to the plurality of cores 11 when the multicore fiber 10 is rotated is the same as that of the above-described embodiments. That is, i) a combination of a single-core fiber 21a and three single-core fibers 21b, and ii) a combination of a single-core fiber 21a and three single-core fibers 21c.

As shown in FIG. 7B, the inter-core distance (inter-core distance between the single-core fiber 21a and the three single-core fibers 21b) of the combination i) is set to r1, and the inter-core distance (inter-core distance between the core fiber 21a and the three single-core fibers 21c) of the combination ii) is set to r2. As shown in FIG. 7A, the inter-core distance (distance between the cores 11) of the multicore fiber 10 is set to r3.

When obtaining the coupling loss of each core 11 of the multicore fiber 10 shown in FIG. 7A and the fan-in/fan-out device 20 shown in FIG. 7B, first, the end portion of the multicore fiber 10 and the end portion E2 of the fan-in/fan-out device 20 are captured. Next, the difference between the distance between the cores 11 of the multicore fiber 10 and the distance between the single-core fibers 21 of the fan-in/fan-out device 20 is determined from the respective images obtained by capturing. Then, the coupling loss for each core 11 is estimated based on the difference. In the case of step index type fiber, for example, the following equation (1) can be used to estimate the coupling loss.

(Equation 1)

$$L(\text{dB}) = -10\log\left(1 - \frac{4\sigma}{\pi D}\right) \quad (1)$$

In the equation (1) described above, D is the core diameter, and c is the positional displacement amount between the cores to be connected.

When the coupling loss for each core 11 is determined, for example, steps S13 to S15 in FIG. 6 are sequentially performed. For example, when the relationship |r3−r1|≤|r3−r2| is satisfied, the end portion of the multicore fiber 10 and the end portion (end portion E3) of the fan-in/fan-out device 20 are fusion-spliced so that the combination of the single-core fiber 21a and the three single-core fibers 21b shown in FIG. 7B and the core 11 of the multicore fiber 10 are connected. On the other hand, when the relationship of |r3−r1|>|r3−r2| is satisfied, the end portion of the multicore fiber 10 and the end portion (end portion E3) of the fan-in/fan-out device 20 are fusion-spliced so that the combination of the single-core fiber 21a and the three single-core fibers 21c shown in FIG. 7B and the core 11 of the multicore fiber 10 are connected.

According to one or more embodiments, based on an image obtained by capturing the end portion of the multicore fiber 10 and the fan-in/fan-out device 20 without making the optical signal incident on the multicore fiber 10 and the fan-in/fan-out device 20, the coupling loss is determined. However, as in the above-described embodiments, an optical signal may be made incident on the multicore fiber 10 and the fan-in/fan-out device 20 to determine the coupling loss.

Further, in the embodiments described above, the inter-core distance indicates a distance between the core (core 11, single-core fiber 21a) disposed at the center of the multicore fiber 10 or the fan-in/fan-out device 20 and the other cores (core 11, single-core 21b or single-core fiber 21c). If there is no centrally placed core, the inter-core distance may be a distance from the center of the multicore fiber 10 or the fan-in/fan-out device 20, or a distance between two adjacent cores.

As described above, in one or more embodiments, among a plurality of combinations of the single-core fibers 21 that can be connected to the core 11 of the multicore fiber 10, a combination of the single-core fibers 21 where the coupling loss or the variation of the coupling loss is small can be selected and connected to the core 11 of the multicore fiber 10. For this reason, it is possible to manufacture an optical device with a small optical loss due to a manufacturing error.

Figure 8A:
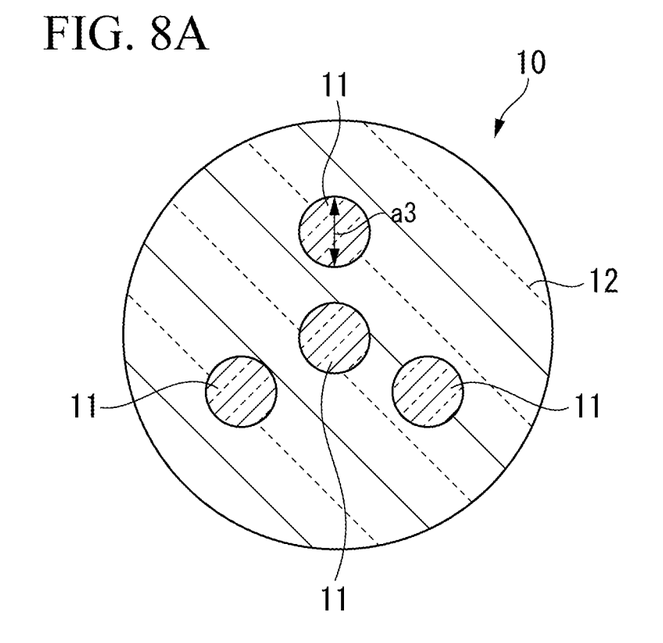
FIG. 8A is a cross-sectional view showing one example of a multicore fiber and a fan-in/fan-out device according to one or more embodiments of the present invention.
Figure 8B:
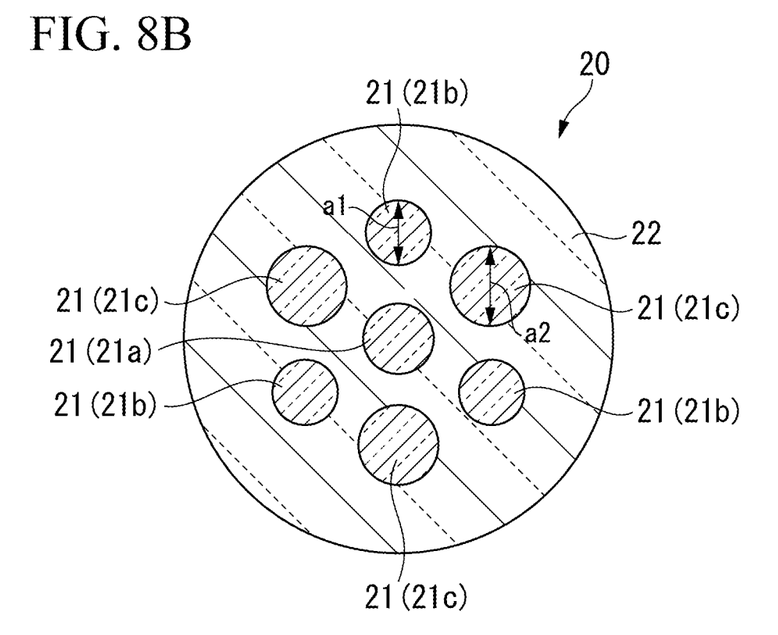
FIG. 8B is a cross-sectional view showing one example of a multicore fiber and a fan-in/fan-out device according to one or more embodiments of the present invention.

FIGS. 8A and 8B are cross-sectional views showing an example of a multicore fiber and a fan-in/fan-out device according to one or more embodiments of the present invention. FIG. 8A is a cross-sectional view of the multicore fiber 10 at the connection point C2, and FIG. 8B is a cross-sectional view of the fan-in/fan-out device 20 at the connection point C2.

According to one or more embodiments discussed below, the configuration of the fan-in/fan-out device 20 manufactured in Step S11 in FIG. 6 and the method of obtaining the coupling loss in Step S12 in FIG. 6 are different from those in the embodiments described above. In particular, in the fan-in/fan-out device 20 manufactured according to one or more embodiments, the diameter of the single-core fiber 21 is different for each combination of the single-core fibers 21 to be connected to the core 11 of the multicore fiber 10. Furthermore, according to one or more embodiments, without making an optical signal incident on the multicore fiber 10 and the fan-in/fan-out device 20, the coupling loss is estimated from an image obtained by capturing the end portions of the multicore fiber 10 and the fan-in/fan-out device 20. The loss due to the difference in the core diameter can be estimated, for example, by using the proportion to the square of the core diameter ratio when light is transmitted from the larger core diameter to the smaller core diameter.

Also in the fan-in/fan-out device 20 according to one or more embodiments, the combinations that can be connected to the plurality of cores 11 when the multicore fiber 10 is rotated are the same as that of the above-described embodiments. That is, the combinations are: i) a combination of single-core fiber 21a and three single-core fibers 21b, and ii) a combination of single-core fiber 21a and three single-core fibers 21c.

As shown in FIG. 8B, the core diameter (core diameter of the three single-core fibers 21b) in the combination i) is set to a1, and the core diameter (core diameter of the three single-core fibers 21c) in the combination ii) is set to a2. Here, the diameter of the single-core fiber 21a common to the combinations i) and ii) can be arbitrarily set, but is set to, for example, (a1+a2)/2. As shown in FIG. 8A, the core diameter a3 of the core 11 of the multicore fiber 10 is set.

When obtaining the coupling loss for each core 11 of the multicore fiber 10 shown in FIG. 8A and the fan-in/fan-out device 20 shown in FIG. 8B, according to one or more embodiments, first, the end portion of the multicore fiber 10 and the end portion E2 of the fan-in/fan-out device 20 are captured. Next, the difference between the core diameter of the core 11 of the multicore fiber 10 and the core diameter of the single-core fiber 21 of the fan-in/fan-out device 20 is determined from each image obtained by capturing. Then, the coupling loss for each core 11 is estimated based on the difference.

When the coupling loss for each core 11 is determined, for example, steps S13 to S15 in FIG. 6 are sequentially performed. For example, when the relationship |a3−a1|≤|a3−a2| is satisfied, the end portion of the multicore fiber 10 and the end portion (end portion E3) of the fan-in/fan-out device 20 are fusion-spliced so that the combination of the single-core fiber 21a and the three single-core fibers 21b shown in FIG. 8B and the core 11 of the multicore fiber 10 are connected. On the other hand, when the relationship of |a3−a1|>|a3−a2| is satisfied, the end portion of the multicore fiber 10 and the end portion (end portion E3) of the fan-in/fan-out device 20 are fusion-spliced so that the combination of the single-core fiber 21a and the three single-core fibers 21c shown in FIG. 8B and the core 11 of the multicore fiber 10 are connected.

According to one or more embodiments described above, the loss is estimated using the core diameter; however, a mode field diameter may be used instead. The mode field diameter can be measured by an optical characteristic measurement method (for example, a far-field scanning method, a near-field scanning method, or the like) at the end portion E2 of the fan-in/fan-out device 20. At this time, the coupling loss L can be expressed by the following equation (2) in consideration of the positional displacement amount by the image observation.

(Equation 2)

$$L = -10 \log T \quad (2)$$
$$T = \left(\frac{2w_1 w_2}{w_1^2 + w_2^2}\right)^2 \cdot \exp\left(-\frac{2\sigma^2}{w_1^2 + w_2^2}\right)$$

In the equation (2), w1 and w2 are the respective mode field diameters (corresponding to the above-mentioned core diameters a1 and a2), and σ is the positional displacement amount between the cores.

According to one or more embodiments, based on an image obtained by capturing the end portion of the multicore fiber 10 and the fan-in/fan-out device 20 without making the optical signal incident on the multicore fiber 10 and the fan-in/fan-out device 20, the coupling loss is determined. However, according to one or more embodiments, an optical signal may be made incident on the multicore fiber 10 and the fan-in/fan-out device 20 to determine the coupling loss.

As described above, in one or more embodiments, among a plurality of combinations of the single-core fibers 21 that can be connected to the core 11 of the multicore fiber 10, a combination of the single-core fibers 21 where the coupling loss or the variation of the coupling loss is small can be selected and connected to the core 11 of the multicore fiber 10. For this reason, it is possible to manufacture an optical device with a small optical loss due to a manufacturing error.

As described above, although embodiments of the present invention are described, the present invention can be changed freely within the scope of the present invention, without being limited to the above-mentioned embodiments.

For example, the embodiments described above may be combined appropriately. For example, the method of determining the coupling loss described above may be applied to any embodiments. In addition, for each combination of single-core fibers 21 connected to the core 11 of the multicore fiber 10, the distance between the single-core fibers 21 may be different, and also the core diameter and the mode field diameter may be different.

Figure 9A:
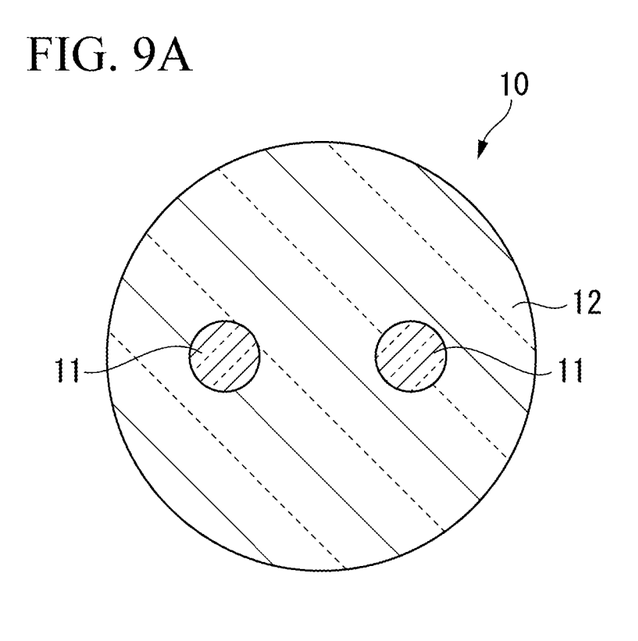
FIG. 9A is a cross-sectional view showing another example of a multicore fiber and a fan-in/fan-out device.
Figure 9B:
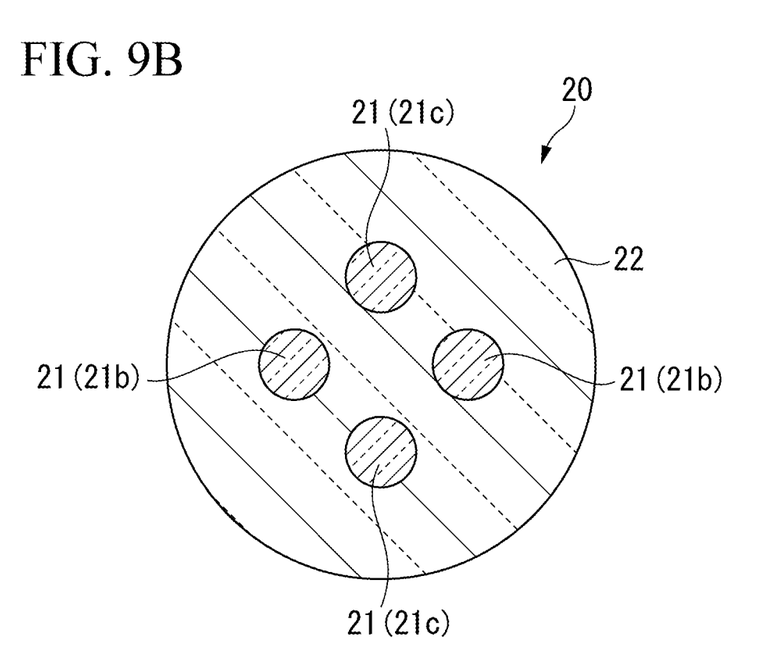
FIG. 9B is a cross-sectional view showing another example of a multicore fiber and a fan-in/fan-out device.
Figure 10A:
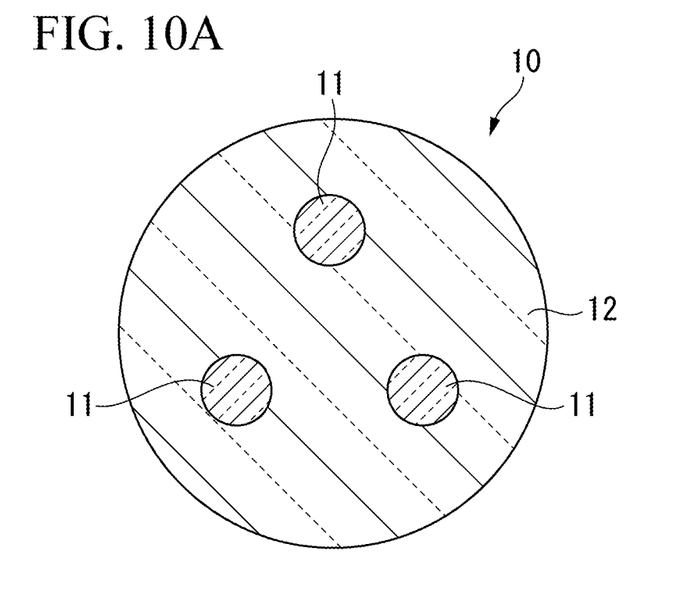
FIG. 10A is a cross-sectional view showing another example of a multicore fiber and a fan-in/fan-out device.
Figure 10B:
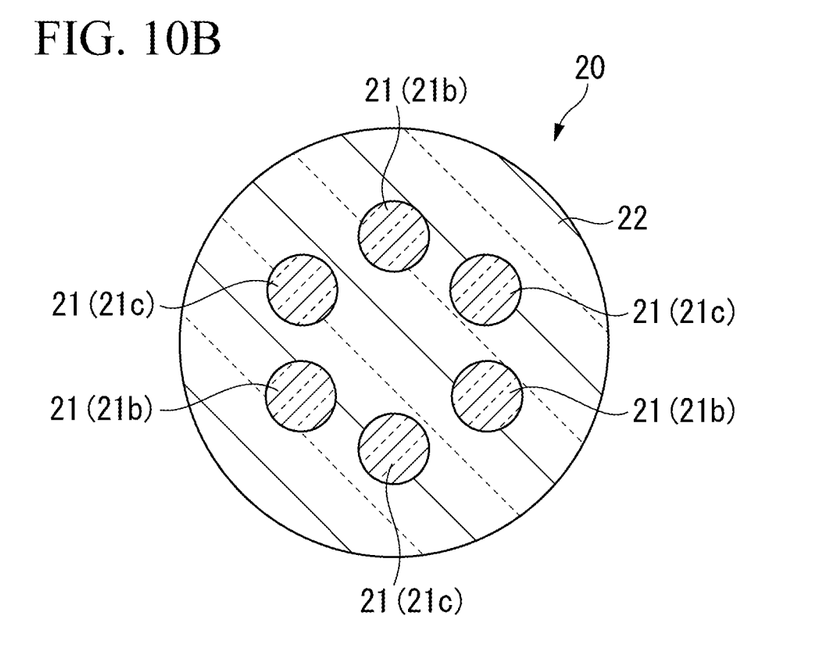
FIG. 10B is a cross-sectional view showing another example of a multicore fiber and a fan-in/fan-out device.

According to the embodiments described above, the multicore fiber 10 having four cores 11 has been described as an example; however, the multicore fiber 10 is not limited to having four cores 11, and a multicore fiber 10 having any number of cores 11 can be used. FIGS. 9A to 10B are cross-sectional views showing another examples of a multicore fiber and a fan-in/fan-out device. FIGS. 9A, 9B, and 10A are cross-sectional views at the connection point C2 of the multicore fiber 10, and FIG. 10B is a cross-sectional view at the connection point C2 of the fan-in/fan-out device 20.

The multicore fiber 10 shown in FIG. 9A has two cores 11 arranged concentrically around the center of the multicore fiber 10. For such a multicore fiber 10, for example, a fan-in/fan-out device 20 shown in FIG. 9B is used. In the fan-in/fan-out device 20, four single-core fibers 21 (21b, 21c) are arranged concentrically around the center of the fan-in/fan-out device 20. In the example shown in FIG. 9B, the single-core fibers 21b and the single-core fibers 21c are alternately arranged along the circumferential direction.

In the example shown in FIG. 9A and FIG. 9B, when the multicore fiber 10 is rotated, combinations that can be connected to the plurality of cores 11 are: iii) a combination of two single-core fibers 21b, and iv) a combination of two single-core fibers 21c. The combination iii) is possible, for example, in a case of the core 11 of the multicore fiber 10 shown in FIG. 9A, and the combination iv) is possible, for example, when the core 11 of the multicore fiber 10 shown in FIG. 9A is rotated by 90°.

The multicore fiber 10 shown in FIG. 10A has three cores 11 arranged concentrically around the center of the multicore fiber 10. For such a multicore fiber 10, for example, a fan-in/fan-out device 20 shown in FIG. 10B is used. In the fan-in/fan-out device 20, six single-core fibers 21 (21b, 21c) are arranged concentrically around the center of the fan-in/fan-out device 20. In the example shown in FIG. 10B, the single-core fibers 21b and the single-core fibers 21c are alternately arranged along the circumferential direction.

In the example shown in FIGS. 10A and 10B, the combinations that can be connected to the plurality of cores 11 when the multicore fiber 10 is rotated are: v) a combination of three single-core fibers 21b, and vi) a combination of three single-core fibers 21c. The combination v) is possible, for example, in a case of the core 11 of the multicore fiber 10 shown in FIG. 10A, and the combination vi) is possible, for example, when the core 11 of the multicore fiber 10 shown in FIG. 10A is rotated by 180°.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical device
10: Multicore fiber
11: Core
20: Fan-in/fan-out device
21: Single-core fiber
E3: End portion

The invention claimed is:

1. A method of manufacturing an optical device that comprises a multicore fiber and a fan-in/fan-out device that connects to the multicore fiber, the method comprising:
   determining optical losses for connections between cores of the multicore fiber and single-core fibers of the fan-in/fan-out device, wherein
      a number of the single-core fibers is greater than a number of the cores,
      the determining the optical losses comprises aligning different sets of the single-core fibers with the cores at different rotation angles of the fan-in/fan-out device around an axis of the fan-in/fan-out device to temporarily form different connection combinations between the single-core fibers and the cores, and
      the determining the optical losses comprises determining the optical losses in each of the different connection combinations;
   selecting one of the connection combinations based on the determined optical losses; and
   connecting an end portion of the multicore fiber and an end portion of the fan-in/fan-out device to connect the single-core fibers with the cores based on the one of the connection combinations.

2. The method according to claim 1, wherein
   the determining the optical losses further comprises measuring an intensity of an optical signal for each of the cores in a state where the end portion of the multicore fiber and the end portion of the fan-in/fan-out device are in proximity, and
   the optical signal is input from either the multicore fiber or the fan-in/fan-out device and output from either the multicore fiber or the fan-in/fan-out device that is not used as an input.

3. The method according to claim 1, wherein the determining the optical losses further comprises:
   capturing an image of the end portion of the multicore fiber and an image of the end portion of the fan-in/fan-out device;
   determining a difference between a distance between two of the cores and a distance between two of the single-core fibers from the image of the end portion of the multicore fiber and the image of the end portion of the fan-in/fan-out device; and
   calculating the optical losses based on the difference.

4. The method according to claim 1, wherein the determining the optical losses further comprises:
   capturing an image of the end portion of the multicore fiber and an image of the end portion of the fan-in/fan-out device;
   determining a difference between a core diameter of one of the cores and a core diameter of one of the single-core fibers from the image of the end portion of the multicore fiber and the image of the end portion of the fan-in/fan-out device; and
   calculating the optical losses based on the difference.

5. The method according to claim 1, wherein the determining the optical losses further comprises:
   measuring optical characteristics at the end portion of the multicore fiber and at the end portion of the fan-in/fan-out device;
   determining a difference between a mode field diameter of one of the cores and a mode field diameter of one of the single-core fibers obtained based on the measured optical characteristics; and
   calculating the optical losses based on the difference.

6. The method according to claim 1, further comprising:
   preparing the fan-in/fan-out device, wherein
   a distance between the single-core fibers is different for each of the connection combinations.

7. The method according to claim 1, further comprising:
   preparing the fan-in/fan-out device, wherein
   a core diameter of the single-core fibers is different for each of the connection combinations.

* * * * *